United States Patent
Goswami et al.

(10) Patent No.: US 8,554,370 B2
(45) Date of Patent: Oct. 8, 2013

(54) MACHINE LEARNING APPROACH FOR PREDICTING HUMANOID ROBOT FALL

(75) Inventors: Ambarish Goswami, Fremont, CA (US); Shivaram Kalyanakrishnan, Austin, TX (US)

(73) Assignee: Honda Motor Co., Ltd, Tokyo (JP)

( * ) Notice: Subject to any disclaimer, the term of this patent is extended or adjusted under 35 U.S.C. 154(b) by 813 days.

(21) Appl. No.: 12/696,783

(22) Filed: Jan. 29, 2010

(65) Prior Publication Data

US 2010/0292838 A1    Nov. 18, 2010

Related U.S. Application Data

(60) Provisional application No. 61/216,377, filed on May 15, 2009.

(51) Int. Cl.
*G05B 19/04* (2006.01)
*G06F 15/18* (2006.01)
*G06N 3/02* (2006.01)
*G06N 3/08* (2006.01)

(52) U.S. Cl.
USPC .............................. 700/253; 700/254; 901/1

(58) Field of Classification Search
USPC ................ 700/245–264; 901/1–52
See application file for complete search history.

(56) References Cited

U.S. PATENT DOCUMENTS

| | | | |
|---|---|---|---|
| 6,330,494 B1 | 12/2001 | Yamamoto | |
| 7,053,579 B2 | 5/2006 | Moridaira | |
| 7,402,974 B2 | 7/2008 | Jeon | |
| 2003/0233170 A1* | 12/2003 | Ohtani et al. | 700/245 |
| 2004/0036437 A1* | 2/2004 | Ito | 318/568.12 |
| 2004/0236469 A1* | 11/2004 | Moridaira et al. | 700/245 |
| 2005/0065650 A1* | 3/2005 | Lewis | 700/245 |
| 2005/0113973 A1* | 5/2005 | Endo et al. | 700/245 |
| 2005/0119791 A1* | 6/2005 | Nagashima | 700/253 |
| 2007/0016329 A1 | 1/2007 | Herr et al. | |
| 2009/0132087 A1* | 5/2009 | Pratt et al. | 700/258 |
| 2010/0057253 A1* | 3/2010 | Kwon et al. | 700/245 |
| 2012/0245735 A1* | 9/2012 | Lee et al. | 700/255 |

OTHER PUBLICATIONS

Foster, K. et al., "Combining a Rule-Based Expert System and Machine Learning in a Simulated Mobile Robot Control System," 2003, 1 page abstract, [Online] [Retrieved Jul. 9, 2010] Retrieved from the Internet URL:http://portal.acm.org/citation.cfm?id=998083.

(Continued)

*Primary Examiner* — Khoi Tran
*Assistant Examiner* — Dale Moyer
(74) *Attorney, Agent, or Firm* — Fenwick & West LLP; Mark Duell

(57) ABSTRACT

A system and method is disclosed for predicting a fall of a robot having at least two legs. A learned representation, such as a decision list, generated by a supervised learning algorithm is received. This learned representation may have been generated based on trajectories of a simulated robot when various forces are applied to the simulated robot. The learned representation takes as inputs a plurality of features of the robot and outputs a classification indicating whether the current state of the robot is balanced or falling. A plurality of features of the current state of the robot, such as the height of the center of mass of the robot, are determined based on current values of a joint angle or joint velocity of the robot. The current state of the robot is classified as being either balanced or falling by evaluating the learned representation with the plurality of features of the current state of the robot.

16 Claims, 11 Drawing Sheets

(56) References Cited

OTHER PUBLICATIONS

Hohn, O. et al.,"Detection and Classification of Posture Instabilities of Bipedal Robots," Proceedings of the 8th International Conference on Climbing and Walking Robots and the Support Technologies for Mobile Machines (CLAWAR 2005), pp. 409-416.

Karssen, J.G. et al., "Fall Detection in Walking Robots by Multi-way Principal Component Analysis," Robotica, 2009, vol. 27, pp. 249-257.

PCT International Search Report and Written Opinion, PCT Application No. PCT/US2010/023405, Mar. 18, 2010, 7 pages.

Renner, R. et al., "Instability Detection and Fall Avoidance for a Humanoid Using Attitude Sensors and Reflexes," Proceedings of the 1006 IEEE/RSJ International Conference on Intelligent Robots and Systems, Oct. 9-15, 2006, pp. 2967-2973, Beijing, China.

Stuckler, J. et al., "Getting Back on Two Feet: Reliable Standing-up Routines for a Humanoid Robot," 2003, IOS Press.

* cited by examiner

```
if  footContactMode = L-LEFT  then                802
   if  d-lin-mom-y ≥ -64.50  and  d-ang-mom-x ≤ 15.95  and  lin-mom-z ≤ -1.16  and  d-lin-mom-x ≥ -106.14  then
      class ← falling.
   else if  ang-mom-y ≤ -14.18  and  lin-mom-x ≤ -24.54  then
      class ← falling.
   else if  d-lin-mom-y ≥ -19.36  and  com-y ≥ -0.04  and  lin-mom-y ≥ 5.87  then
      class ← falling.
   else if  ang-mom-y ≥ 11.77  and  ang-mom-y ≥ 18.32  then
      class ← falling.
   else if  com-z ≤ 0.35  then
      class ← falling.
   else if  ang-mom-y ≤ -14.18  and  lin-mom-y ≤ -11.45  then
      class ← falling.
   else if  com-z ≥ 0.62  then
      class ← falling.
   else
      class ← balanced.
```

FIG. 8

MACHINE LEARNING APPROACH FOR PREDICTING HUMANOID ROBOT FALL

CROSS-REFERENCE TO RELATED APPLICATION

This application claims the benefit of U.S. Provisional Application No. 61/216,377, filed May 15, 2009, which is incorporated by reference in its entirety.

BACKGROUND

1. Field of the Invention

The present invention relates to predicting a fall of a humanoid robot.

2. Description of Background Art

Several factors can threaten the balance of humanoid robots. These factors include unexpected external forces, power failure, component failure, communication failure, or foot slippage, among others. As a result, robots are typically monitored in controlled environments that involve very little physical contact. Yet, as humanoid robots gain more autonomy and enter realistic human environments, inevitably they will encounter threats to fall more frequently. Falls are undesirable because they can cause physical damage to the robot and its surroundings. This calls for the development of an integrated fall management strategy that includes fall avoidance (balance maintenance), prediction, and control.

Fall avoidance schemes attempt to reduce the incidence of fall. When fall does occur, fall control schemes can potentially minimize damage to the robot and its surroundings. For example, a fall control scheme can cause the robot to move so that it changes its direction of fall and avoids hitting a nearby object when falling. What is needed is a way to predict the occurrence of a fall so that a controller of the robot can switch from fall avoidance to fall control at the appropriate time. Such a prediction can prompt the robot to abandon the balance maintenance mode and execute a fall control mode.

SUMMARY

Embodiments of the invention provide techniques for predicting a fall of a robot having at least two legs. A learned representation, such as a decision list, generated by a supervised learning algorithm is received. This learned representation may have been generated based on trajectories of a simulated robot when various forces are applied to the simulated robot. The learned representation takes as inputs a plurality of features of the robot and outputs a classification indicating whether the current state of the robot is balanced or falling. A plurality of features of the current state of the robot, such as the height of the center of mass of the robot or the foot contact mode of the robot, are determined based on current values of a joint angle or joint velocity of the robot. The current state of the robot is classified as being either balanced or falling by evaluating the learned representation with the plurality of features of the current state of the robot. If the current state of the robot is classified as falling, a fall controller of the robot can be activated to control the robot to fall in a manner that reduces damage.

BRIEF DESCRIPTION OF THE DRAWINGS

The invention is illustrated by way of example, and not by way of limitation, in the figures of the accompanying drawings in which like reference numerals refer to similar elements.

FIG. 8 illustrates a decision list generated from training data, in one embodiment.

DETAILED DESCRIPTION OF THE EMBODIMENTS

Figure 1A:
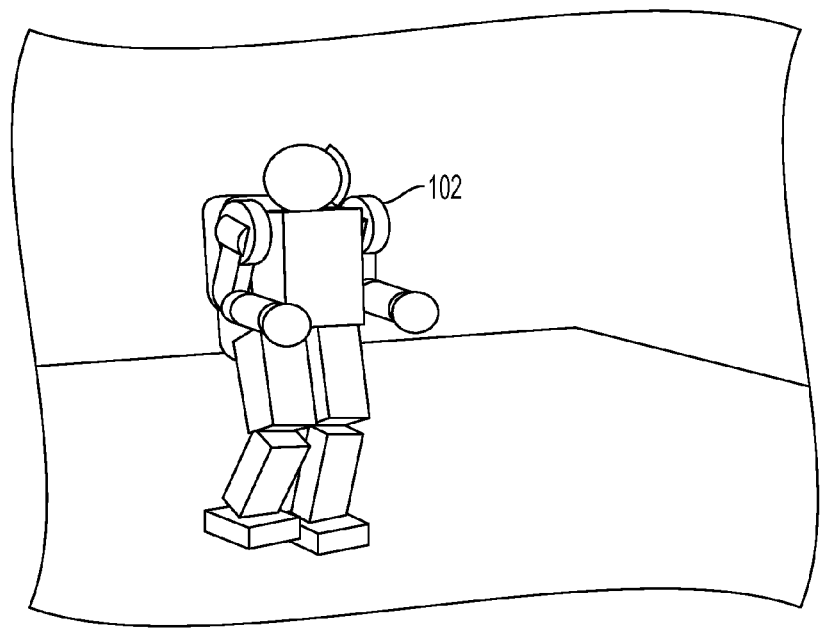
FIG. 1A illustrates a humanoid robot in a balanced state, in one embodiment.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Figure 1B:
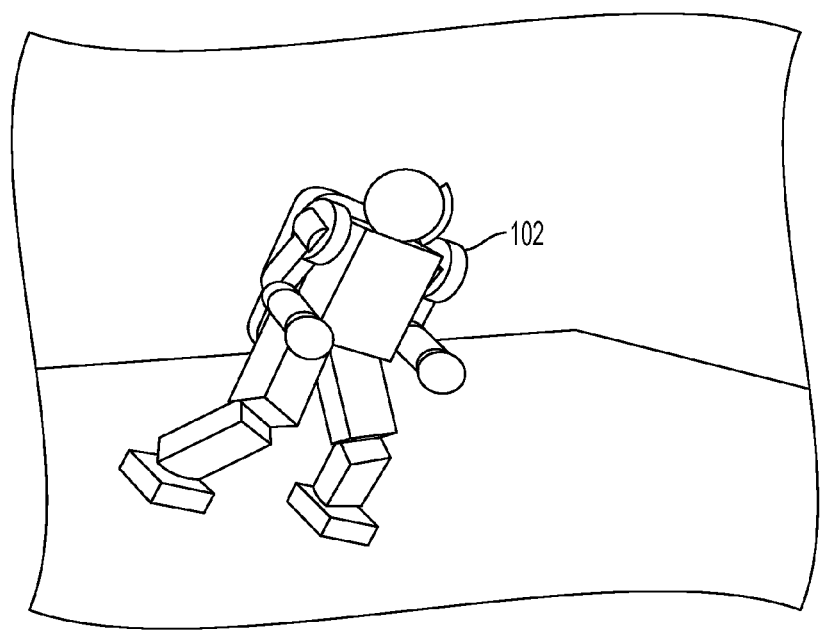
FIG. 1B illustrates a humanoid robot in a falling state, in one embodiment.

FIG. 1A illustrates a humanoid robot 102 in a balanced state while FIG. 1B illustrates a humanoid robot in a falling state, in one embodiment. A fall predictor classifies the robot's current state as being balanced, as in FIG. 1A, or falling, as in FIG. 1B. Such a classification can enable a controller of the robot 102 to switch from a balance controller to a fall controller, where the fall controller attempts to minimize damage to the robot or its surroundings during the fall. The fall controller may do this by causing the robot 102 to take a step or make other movements that result in a desirable change in the direction of fall. For example, the robot may take a step to change its direction of fall so that it avoids hitting a nearby person.

For a fall controller to be effective, it must be given sufficient time to influence the fall. Thus, the prediction of imminent fall should happen at the earliest, maximizing the lead time to fall. At the same time, there should not be false predictions of fall, which would waste time by replacing the balance controller with a fall controller, and might thereby potentially cause a fall. In other words, the fall predictor needs to minimize false positives. In practice, trying to predict fall early typically results in a high false positive rate, mainly because the system dynamics are very complex. Therefore, a good fall predictor should satisfactorily trade off the conflicting objectives of high lead time and low false positive rate.

The fall controller uses a machine learning approach for predicting fall. An advantage of a learning-based approach is that it is data-driven, and so can be applied with little change to adapt to the wear and tear of parts of a robot, or even to fit the requirements of different humanoid robots. Also, a learning-based approach results in a reactive strategy, under which predictions can be made almost instantaneously when deployed on a robot.

Figure 2:
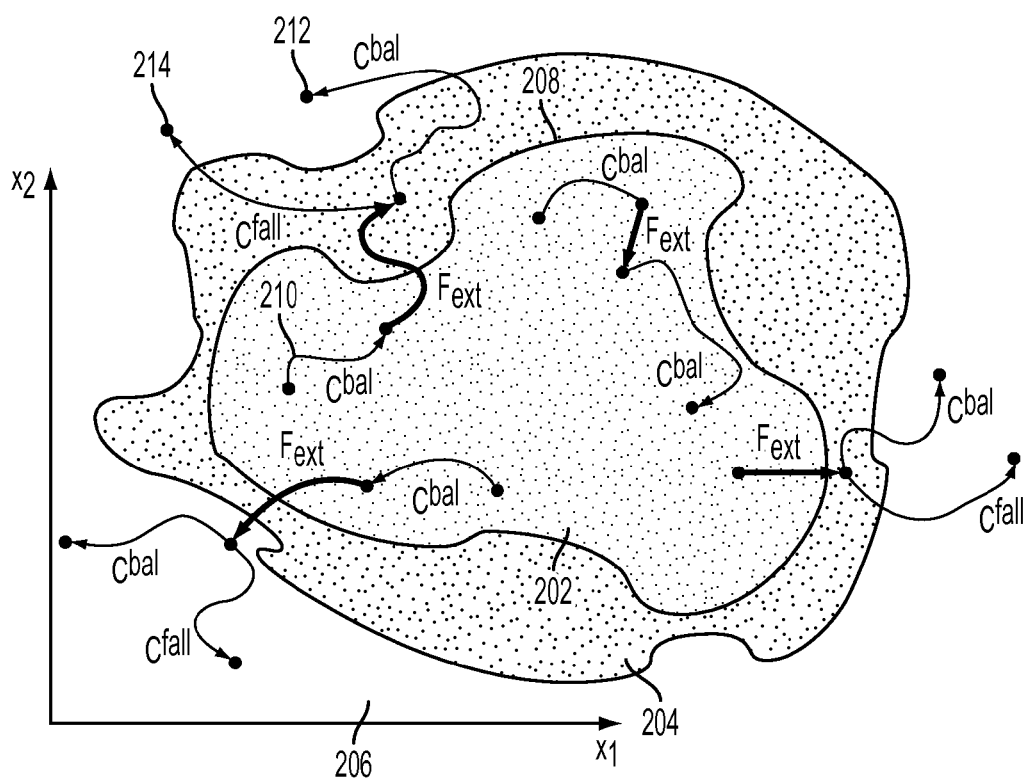
FIG. 2 illustrates a robot's feature space partitioned into balanced, falling, and fallen regions, in one embodiment.

FIG. 2 illustrates a robot's feature space partitioned into balanced, falling, and fallen regions, in one embodiment. The feature space is a multi-dimensional space spanned by axes representing the robot's configuration, conveying information from its joint angles and velocities, available sensor data, and other derived variables such as inertia and momentum. Though the feature space illustrated in FIG. 2 shows only two axes ($x_1$ and $x_2$), the feature space may have many additional dimensions and corresponding axes. With time, the robot traces a trajectory in the feature space. The feature space can be partitioned into three classes: balanced, falling, and fallen. The fall trigger boundary (FTB) is the boundary separating the balanced and falling classes.

The fallen class is illustrated in FIG. 2 as region 206, the outermost region. The fallen region 206 comprises states which satisfy some rule to identify a fallen robot, such as whether parts of the robot's body other than its feet are in contact with the ground, or whether its center of mass (CoM) falls below some threshold height (e.g., 0.33 meters). The balanced class, illustrated as the innermost region 202, comprises states from which applying a balance controller $C^{bal}$ will not lead to a fallen configuration when the only forces acting on the robot are its weight W, the resultant ground reaction force R, and friction $F_{fr}$. For a given robot, the shape of the balanced region 202 is specific to the balance controller of the robot; generally, a "better" balance controller $C^{bal}$ will enjoy a larger balanced region. Intermediate states that are neither balanced nor fallen are designated as falling states in region 204. Trajectories emanating from falling 204 necessarily terminate in fallen 206 under $C^{bal}$. The FTB is illustrated as the boundary 208 between the balanced 202 and falling 204 regions.

External forces $F_{ext}$, resulting from pushes, foot slippage, motor failure, etc., could jerk the robot out of the balanced region 202. While some external force is necessary to cause the robot to cross the FTB 208, $C^{bal}$ may yet succeed in retaining the robot within balanced 202 under some forces. When external forces do cause trajectories inside balanced 202 to breach the FTB 208, the robot is certain to reach a fallen 206 state if it continues to apply $C^{bal}$ and there are no further external forces to oppose the fall. If the fall predictor detects the breach of the FTB 208, the robot may apply its fall controller $C^{fall}$.

FIG. 2 includes various trajectories that may be taken through the feature space by the robot. For example, trajectory 210 begins in the balanced region 202 and includes some movement under $C^{bal}$. While still in the balanced region 202, an external force (e.g., a push) $F_{ext}$ acts on the robot, causing it to enter the falling region 204. From that point, the robot falls to a state in the fallen region 206 regardless of which controller operates. However, if the robot switches to the fall controller $C^{fall}$ it ends up at fallen state 214 instead of at fallen state 212, which is reached if the balance controller $C^{bal}$ continues to operate. Fallen state 214 may be preferred to fallen state 212 because it avoids the robot hitting surrounding objects or people.

Figure 3:
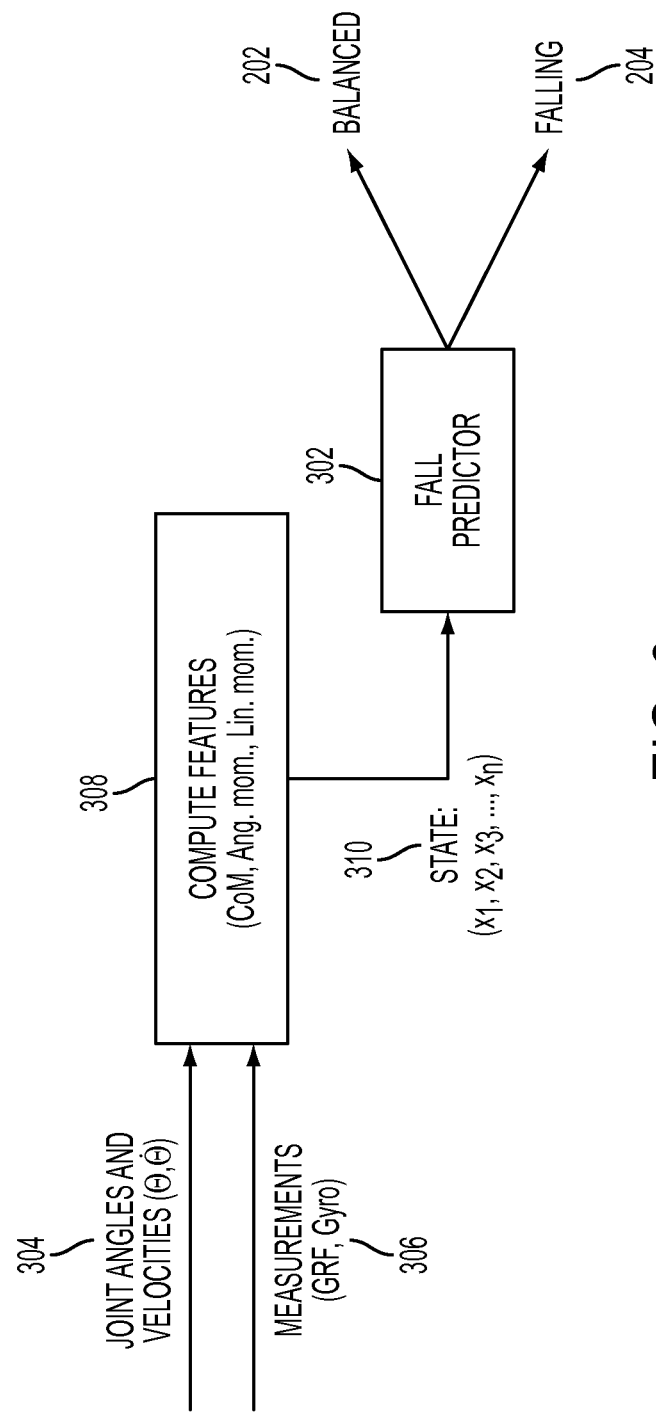
FIG. 3 illustrates a system for predicting a fall of a robot, in one embodiment.

FIG. 3 illustrates a system for predicting a fall of a robot, in one embodiment. Joint angles and velocities 304 of the robot and various other measurements 306 of the robot, such as ground reaction force (GRF) measurements or gyroscopic measurements, are received. These measurements may be computed based on sensors or other measurement devices on the robot. The joint angles and velocities 304 and the other measurements 306 are processed in module 308 to determine features of the robot. These features may include the CoM of the robot, the angular momentum of the robot, and the linear momentum of the robot, for example. These features represent a state 310 of the robot, where each feature is a coordinate $x_n$. The state is a point in an n-dimensional feature space, such as the feature space illustrated in FIG. 2. The fall predictor 302 determines whether the current state 310 is a balanced 202 or falling 204 state.

False negatives, which occur when the fall predictor 302 never predicts falling 204 until the robot reaches fallen 206, can be weeded out quite effectively by adding a rule to predict falling if the CoM drops below some vertical height threshold. However, false positives are difficult to avoid, especially if the fall predictor 302 has to make early predictions of falling 204 along trajectories which do result in fallen 206.

If falling 204 is predicted at time $t_{predict}$ and the robot enters the fallen 206 class at time $t_{fallen}$, then $(t_{fallen}-t_{predict})$ is the duration available for $C^{fall}$ to act before the robot has fallen. The fall predictor 302 aims to optimize two objectives, defined over a set T of trajectories followed by the robot. The False Positive Rate (FPR) of a fall predictor 302 is the fraction of trajectories from T in which falling is predicted for a balanced state. Since each such incorrect prediction prompts an unnecessary invocation of $C^{fall}$, FPR should be minimized. The Lead Time, $\tau_{lead}$, of a fall predictor is defined as the average value of $t_{predict}^\mu$ over all trajectories $\mu \in T$ that terminate in fallen 206, assuming $C^{fall}$ is deployed from $t_{predict}^\mu$ onwards. Higher values of $\tau_{lead}$ imply that $C^{fall}$ gets more time on average to respond to a fall; thus $\tau_{lead}$ is to be maximized. The fall predictor 302 with the lowest FPR (i.e., zero) is one that predicts balanced 202 for every input state; unfortunately, such a fall predictor also has the lowest value of $\tau_{lead}$ (i.e., zero). At the opposite extreme, a fall predictor that always predicts falling 206 has maximal $\tau_{lead}$, but correspondingly, an FPR of 100%.

Figure 4:
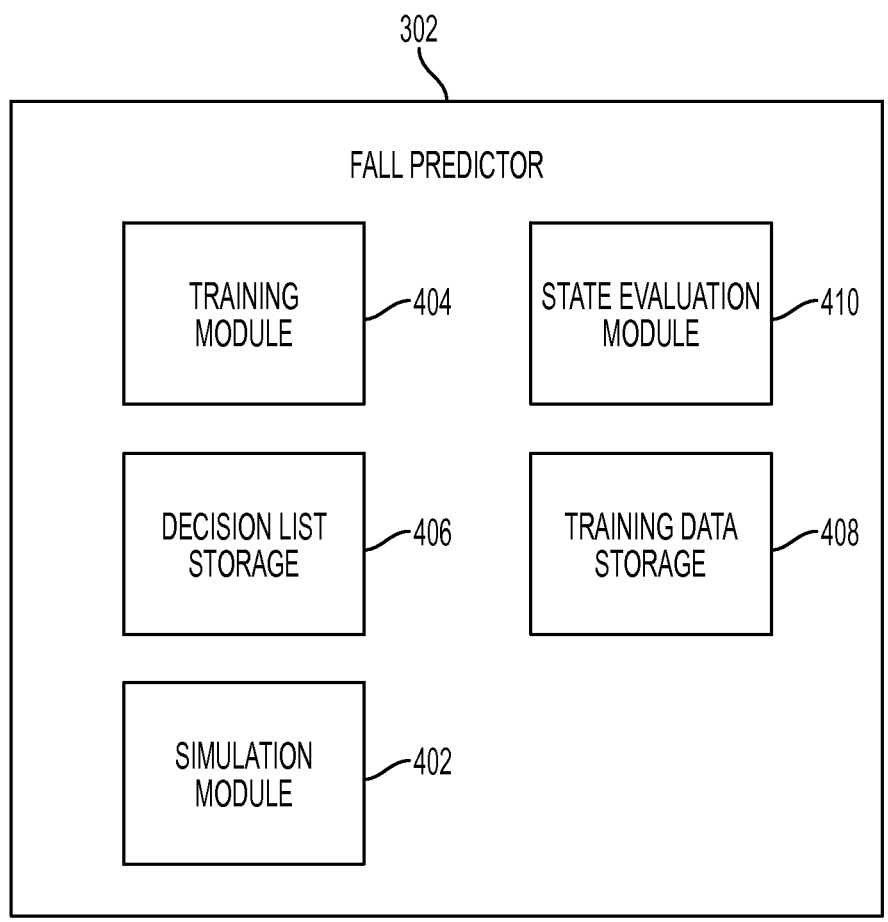
FIG. 4 is a block diagram illustrating a fall predictor for predicting a fall of a humanoid robot, in one embodiment.

FIG. 4 is a block diagram illustrating a fall predictor 302 for predicting a fall of a humanoid robot, in one embodiment. The fall predictor enables the robot to predict a fall of the robot and to switch to a fall controller upon such a prediction. The fall predictor includes a training module 404, a simulation module 402, a state evaluation module 410, a decision list storage 406, and training data storage 408. These modules and items are discussed further below.

Figure 5:
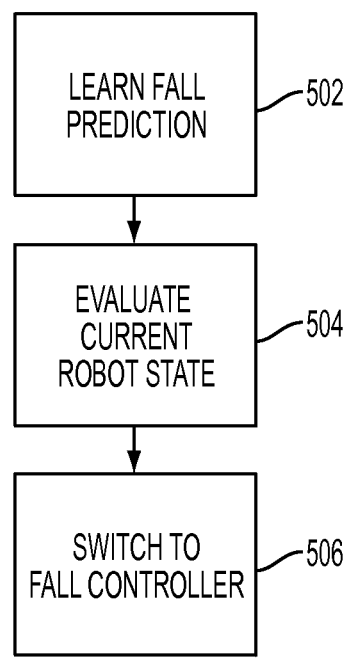
FIG. 5 is a flowchart illustrating a method for predicting the fall of a humanoid robot, in one embodiment.

FIG. 5 is a flowchart illustrating a method for predicting the fall of a humanoid robot, in one embodiment. Initially, the fall predictor learns 502 to predict falls in a variety of possible robot states. This is also referred to as the learning or training phase of fall prediction. The fall predictor then evaluates 504 the current state of the robot to determine whether the robot is falling or balanced. This evaluation may occur continuously as the robot operates in its environment. If the fall predictor determines that the robot is falling (i.e., a fall is predicted), then the fall predictor can cause the robot to switch 506 from its balance controller to its fall controller.

Figure 6:
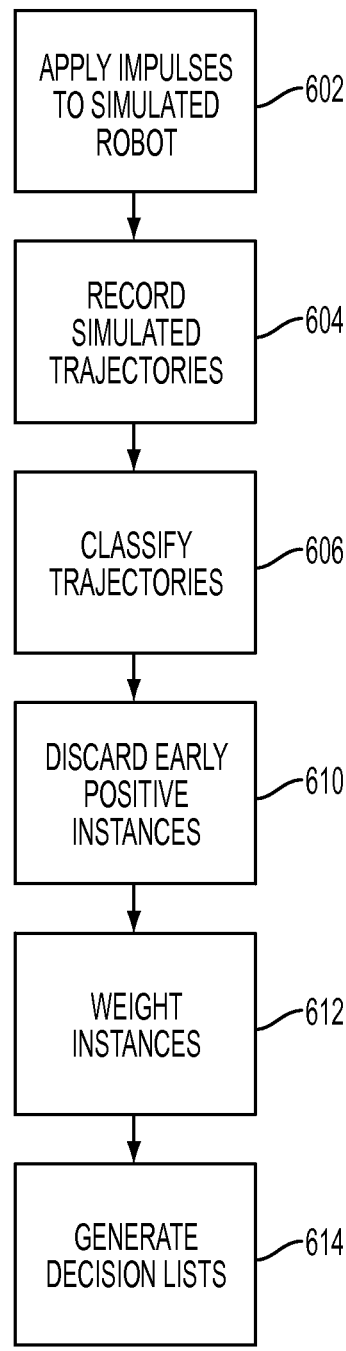
FIG. 6 is a flowchart illustrating the learning or training phase of fall prediction, in one embodiment.

FIG. 6 is a flowchart illustrating the learning or training phase of fall prediction, in one embodiment. The training phase is carried out by the training module 404. The training phase aims to construct a fall predictor 302 that classifies an input state as either balanced or falling, which would determine whether the robot should deploy $C^{bal}$ or $C^{fall}$. The predictor should simultaneously minimize FPR and maximize $\tau_{lead}$. The training phase uses training data which may be obtained using a simulation of a robot via the simulation module 402. For example, commercial robotics simulation software such as Webots 6 by Cyberbotics Ltd. may be used to simulate a two legged humanoid robot. In one embodiment, the simulated robot has a mass of 42.1 kilograms, with its CoM at a height of 0.59 meters above the ground. Each foot has dimensions of 0.225 meters×0.157 meters×0.07 meters. In one embodiment, the simulated robot's balance controller $C^{bal}$ implements the following strategy: if the linear momentum of the robot along either its frontal or sagittal planes exceeds a fixed threshold, the robot widens its stance, thereby increasing the area of its support polygon and lowering its CoM. This is effective in thwarting falls caused by impulses of up to 40 Newton seconds, as observed from experimental results.

Varying impulses, also referred to as pushes, are applied 602 to the simulated robot at random instants of time in its walk cycle. In one embodiment, each push comprises a constant force application for 0.1 seconds, and the force magnitude is drawn uniformly randomly from the range [0, 500 Newtons]. The force is applied horizontally to the torso of the robot, at an angle with its sagittal plane drawn uniformly randomly from [−180°, 180° ], at a height above its CoM drawn uniformly randomly from [−0.05 meters, 0.25 meters]. These ranges are chosen such that roughly half the trajectories result in a fall. Many simulations (e.g., 1,000) can be performed by choosing various combinations of the above parameters to determine pushes to be applied to the simulated robot.

The trajectory of the robot resulting from each push is recorded and stored to the training data storage 408, in one embodiment. The trajectory of a push can be recorded as "instances", also referred to as states, over time, where each instance describes features of the robot. In one embodiment, instances are recorded for each push at 250 Hertz to form the trajectory. Various features of the simulated robot are recorded for each instance. The features are chosen such that they can be easily computed, they are based on easily measurable quantities, and they effectively describe the state of the robot for purposes of fall prediction. The feature choice can be refined based on observations of the effectiveness of the fall predictions.

In one embodiment, a set of 16 features are used, where the features are derived from joint positions and velocities. The features include the components of the following vectors: (1) CoM displacement, (2) linear momentum and (3) its time derivative, and (4) angular momentum about the CoM and (5) its time derivative. Each of these five vectors comprise three real components (x, y, z), accounting for 15 of the 16 features. The vectors may be referenced to a Cartesian coordinate system located at the robot's CoP, with the x and y axes along the ground in the robot's sagittal and frontal planes, respectively, and the z axis vertical.

Figure 7:
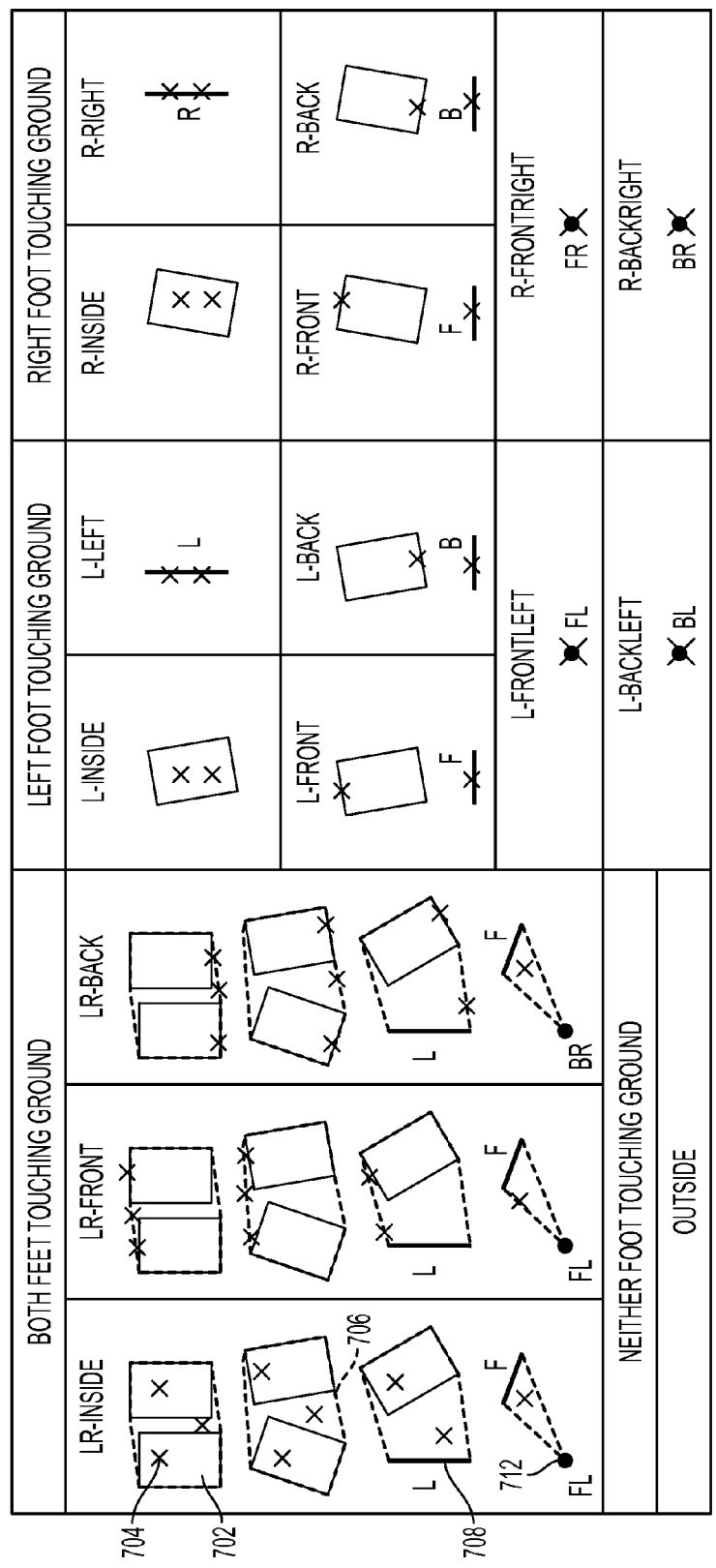
FIG. 7 illustrates various possible foot contact modes of the robot, in one embodiment.

In one embodiment, the $16^{th}$ feature of the set of features is the "foot contact mode" of the robot. FIG. 7 illustrates various possible foot contact modes of the robot, in one embodiment.

The contact region between a foot and the ground may be a rectangle 702, a line (edge) 708, or a point (corner) 712. The dotted lines 706 indicate the support polygon of the robot, where the support polygon is the convex hull surrounding the robot's contact points with the ground. The cross marks 704 indicate possible locations of the CoP of the robot. In FIG. 7, L refers to the left edge of the foot, R refers to the right edge, F refers to the front edge, and B refers to the back edge. A corner is identified by two edges (e.g., BL refers to the back left corner).

Falls predominantly occur when the robot's CoM rotates about an edge or vertex of its support polygon that contains the CoP. The foot contact mode describes the position of the CoP relative to the robot's feet and therefore may be a useful feature for fall prediction. Every state of the robot maps to a foot contact mode, which identifies whether the left and right feet are touching the ground, and if they are, the position of the CoP within the support polygon. Three modes are considered when both feet are touching the ground: LR-INSIDE, LR-FRONT, and LR-BACK. In LR-INSIDE, the CoP lies inside the support polygon, while in LR-FRONT and LR-BACK, it lies on the front and back edges, respectively. Other modes for single support (both left and right) are defined similarly, and one mode (OUTSIDE) describes the case in which neither foot touches the ground. In total, 16 foot contact modes are defined. As a result, the feature vector comprises 16 variables: 15 real-valued variables obtained from five three-component vectors, and one discrete variable that takes one of 16 values. As mentioned above, each instance of a trajectory is a feature vector.

One advantage of the method described above for obtaining training data is that the data can be easily obtained for different robots and balance controllers. If a component of a robot is modified (e.g., its torso weight), the simulation parameters can be similarly modified and new training data can be obtained. This may not be the case for model-based or manually designed solutions. In one embodiment, an actual robot can be used for obtaining training data instead of a simulation. However, this is likely to be more costly and time consuming.

The problem of constructing the fall predictor can be posed as a supervised learning problem. Any supervised learning algorithm and corresponding representation can be used for the fall predictor. Based on experimentation, better results have been obtained for fall prediction using rule-based systems such as decision trees and lists instead of regression based approaches such as neural networks and radial basis functions. In the embodiment described below, decision list learning (or "rule learning") is used. Like decision trees, decision lists are grown recursively by splitting nodes, guided by some heuristic such as information gain. The publicly available Waikato Environment for Knowledge Analysis (Weka) machine learning library can be used to generate decision lists. The step of generating decision lists is shown as step 614 in FIG. 6.

FIG. 8 illustrates a decision list generated from training data, in one embodiment. The decision list takes as input a 16 element vector describing the current state of the robot, where each element of the vector comprises one of the features described above. The various features are compared to particular values in boxes 802. As a result of the comparisons, the current state of the robot is classified as either balanced 202 or falling 204. Empirically, it is observed that more accurate prediction results when a separate decision list is learned for each foot contact mode, rather than when a single decision list is learned, in which the foot contact mode is used as a feature to split the decision. A possible explanation for this observation is that the foot contact modes separate the robot's states into homogenous regions where decision boundaries are more regular. The decision list in FIG. 8 is for the foot contact mode L-LEFT. In total, each learned fall predictor comprises 16 decision lists, one for each foot contact mode.

The list in FIG. 8 makes it apparent that learned solutions can be far more complex than simple thresholding rules such as predicting a fall if the x and y components of the linear momentum exceed certain values. Such thresholding rules generally correspond to decision lists with just two to four comparisons. To get a rough idea of the complexity of learned rules, a "rule size" of a decision list is defined to be the number of comparison operators it contains. The rule size in the example in FIG. 8 is 15. The decision lists generated by the training module 404 are stored in the decision list storage 406 for later use by the state evaluation module 410.

In steps 606, 610, and 612 of FIG. 6 the training data is prepared for the supervised learning algorithm that generates decision lists in step 614. Portions of this preparation involve the use of parameters to control the tradeoff between $\tau_{lead}$ and FPR. Consider a fall predictor 302 that has a prediction accuracy of 99% over all balanced states. Such a predictor could still suffer very high FPR if its few incorrect predictions of predicting falling 204 instead of balanced 202 are distributed over a large number of balanced trajectories, rather than contained to a few. At the other extreme, a fall predictor that has a low accuracy in identifying falling states correctly might still give rise to a high value of $\tau_{lead}$ if its correct predictions occur early in the falling trajectories, since once falling is predicted along a trajectory, subsequent predictions are immaterial. In short, a predictor with a higher prediction accuracy over all the recorded states does not necessarily enjoy lower FPR and higher $\tau_{lead}$. Steps 610 and 612 described below are two techniques to explicitly promote the learning of fall predictors that minimize FPR and maximize $\tau_{lead}$.

In step 606, the trajectories stored in the training data storage are classified as either falling trajectories or balanced trajectories. A trajectory is classified as falling if it ends with the robot in a fallen state 206 and classified as balanced if it does not. A balanced trajectory is referred to as a negative (−) trajectory while a falling trajectory is referred to as a positive (+) trajectory. Each instance within a trajectory is also given the classification of the trajectory (e.g., all of the instances in a negative trajectory are labeled as negative instances).

Figure 9:
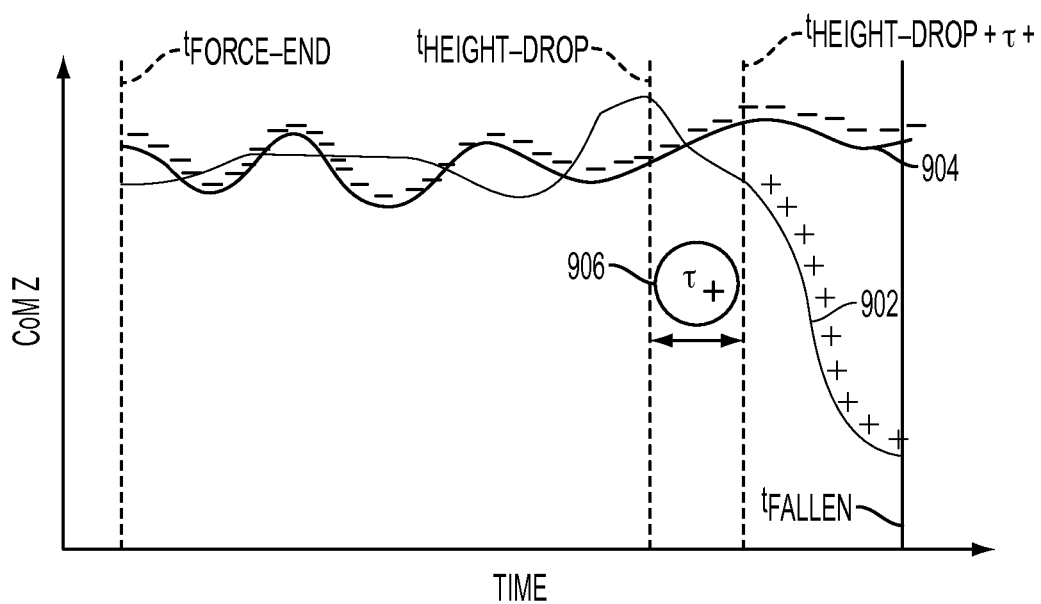
FIG. 9 illustrates a falling trajectory and a balanced trajectory, in one embodiment.

FIG. 9 illustrates a falling trajectory 902 and a balanced trajectory 904, in one embodiment. In FIG. 9, the CoM height, which is one of the 16 features mentioned above, of each trajectory is shown. The trajectories are shown after $t_{force-end}$, the time when the application of the impulse (step 602) ends. Each trajectory is made up of many instances or states over time. As can be seen, states occurring early in the falling trajectory 902 and the balanced trajectory 904 are not easily distinguishable from each other, while states occurring later in the two trajectories are more easily distinguishable. This is often the case. As a result, if states that occur early along the falling trajectory are presented as training data to the learning algorithm, then the learned fall predictor is likely to incur higher FPR. However, since a falling trajectory will end in a fallen state, states close to this extreme can be separated quite easily, such as by a rule that thresholds the height of the CoM.

In principle, all the states in the falling trajectory are valid training examples for the falling class, just as all the states in the balanced trajectory are valid training examples of balanced. However, to reduce the incidence of false positives, the states that occur early along falling trajectories are discarded 610 from the set of positive (falling) training data states that occur early along falling trajectories. Only those positive states that occur after a "cut-off" time are used for training. Since different falling trajectories have different time durations, this cut-off time is standardized by measuring it with respect to the instant $t_{height-drop}$, which is the point of time at which the height of the CoM above the ground begins to drop monotonically until a fallen trajectory is reached.

A parameter $\tau_+$, shown in FIG. 9 with reference 906, is defined such that only falling states 204 that occur beyond the instant ($t_{height-drop}+\tau_+$) and before $t_{fallen}$, the time at which the trajectory enters the fallen class 206, are used as positive training instances for supervised learning. Generally, $\tau_+$ as is increased, the learned fall predictor will have a lower FPR, but also a lower value of $\tau_{lead}$. Decreasing $\tau_+$ (note that $\tau_+$ can be negative) will likely increase both $\tau_{lead}$ and FPR.

All available negative (balanced) states are still used for training. In step 612, these negative states are weighted more than the positive states in the supervised learning. In one embodiment, the negative states are weighted four times the positive states. Informal experimentation has shown that this weighting achieves improved training results.

Figure 10:
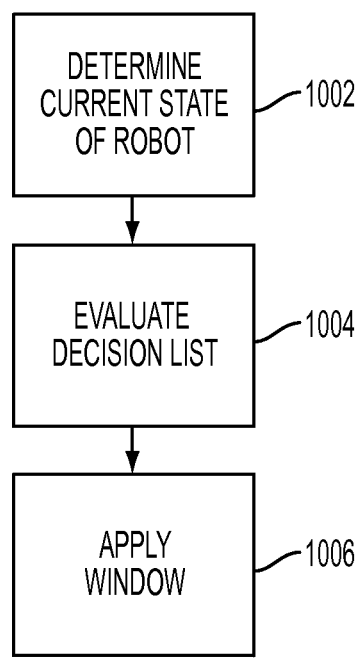
FIG. 10 illustrates a method for evaluating the current state of the robot to determine if the robot is falling, in one embodiment.

FIG. 10 illustrates a method for evaluating 504 the current state of the robot to determine if the robot is falling, in one embodiment. Steps 602 to 614 described above are for training the fall predictor, and these steps may be performed in advance using a simulation. The steps in FIG. 10, performed by the state evaluation module 410, make use these training results (e.g., the generated decision lists) to predict a fall in an actual robot in real time. Initially, the state evaluation module determines the current state of the robot. This involves determining current values of the various features of the robot that were used to generate the decision lists. In the example above, these features included 15 real values and a discrete value for a total of 16 features. If a fall predictor were using the training data created from the example above, it would determine these 16 features in real time. The features can be computed from data received from various sensors on the robot 102.

The evaluation module 410 then evaluates 1004 a decision list from the decision list storage 406. The evaluation module may choose a decision list from among multiple decision lists (e.g., a separate decision list for each value of a discrete valued feature, as discussed above). Evaluating a decision list includes comparing the current features to specified values and following conditional branches based on the comparisons. The result of evaluating the decision list is a classification of the current state as either balanced or falling.

Figure 11:
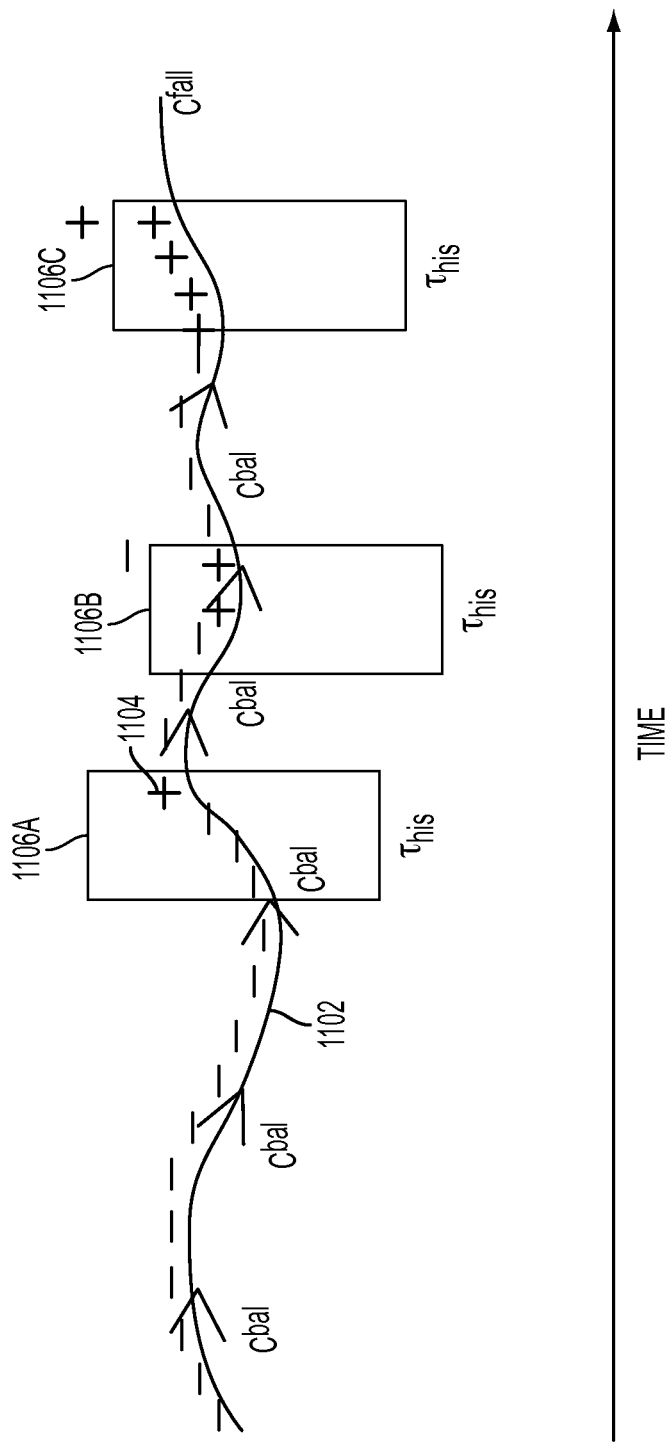
FIG. 11 illustrates the classifications of robot states over time, in one embodiment.

FIG. 11 illustrates the classifications of robot states over time, in one embodiment. FIG. 11 shows a particular feature of the robot state (e.g., the x component of the robot's linear momentum) over time. Steps 1002 and 1004 operate in real time and determine a classification for states of the robot as the robot operates in its environment. In one embodiment, classifications are determined at 250 Hertz (e.g., every 4 milliseconds). The classification of an individual state is represented in FIG. 11 as a + (falling) or − (balanced).

If even a single current state is classified as a falling state, the control of the robot can be switched from the balance controller $C^{bal}$ to the fall controller $C^{fall}$. However, this would make the control policy brittle, over-reactive, and often incorrect, with a single false positive causing an unnecessary deployment of C. For example, the single positive classification 1104 may cause a switch to $C^{fall}$ even though several negative classifications appear after it. This can be avoided by maintaining a finite history of the classifications made using the decision lists, and only predicting a falling state when the lists have consistently produced falling classifications over all states in the history window. FIG. 11 illustrates three of these windows 1106 that are applied in step 1006. The parameter $\tau_{his}$ corresponds to the temporal length of the history window 1106 that is maintained. As can be seen, window 1106A contains only one positive classification while window 1106C contains all positive classifications. In one embodiment, the fall predictor 302 issues a positive prediction only when all the classifications in a moving window 1106 are positive. In one embodiment, a certain specified portion (e.g., 80%) of the classifications in the window must be positive.

A positive quantity, $\tau_{his}$ effectively smoothes out predictions, weeding out stray, short-lived predictions of falling. In doing so, it also has the effect of delaying correct predictions of falling, thereby decreasing $\tau_{lead}$. Together, $\tau_+$ and $\tau_{his}$ provide handles to control the tradeoff between FPR and $\tau_{lead}$: they can be provided by an operator as inputs to the fall predictor. In one embodiment, a conservative fall predictor can be created with a $\tau_+$ of −0.3 seconds and a $\tau_{his}$ of 0.016 seconds. This may result in a high $\tau_{lead}$ but also a high FPR. At the other extreme, a fall predictor with a near zero FPR but also a low $\tau_{lead}$ may be created with a $\tau_+$ of 0.3 seconds and a $\tau_{his}$ of 0.044 seconds. A fall predictor that attempts to better balance FPR with $\tau_{lead}$ may have a $\tau_+$ of −0.25 seconds and a $\tau_{his}$ of 0.060 seconds.

Although the invention has been described in considerable detail with reference to certain embodiments thereof, other embodiments are possible as will be understood to those skilled in the art.

What is claimed is:

1. A computer-implemented method for predicting a fall of a robot having at least two legs, the method comprising:
   generating a learned representation using a supervised learning algorithm, the learned representation taking as inputs a plurality of features of a robot, the learned representation having as an output a classification comprising an indication of a balanced state or a falling state, wherein generating the learned representation using the supervised learning algorithm comprises steps of:
      applying a plurality of simulated force impulses to a simulation of the robot, the force impulses varying in magnitude of force and direction of application;
      recording a plurality of trajectories generated from the motions of the robot after application of the plurality of simulated force impulses, each trajectory comprising a plurality of instances, each instance comprising a plurality of features describing the state of the robot at the particular instance;
      classifying, by a processing device, each instance as a balanced instance or as a falling instance based on whether the trajectory containing the instance ends in a fallen state; and
      processing the features and classification of each instance with the supervised learning algorithm to generate the learned representation;
   determining a plurality of features of a current state of the robot, the determining based at least in part on a current value of a joint angle or joint velocity of the robot; and
   classifying the current state of the robot as being either balanced or falling, the classifying performed by evaluating the learned representation with the plurality of features of the current state of the robot.

2. The method of claim 1, wherein generating the learned representation using the supervised learning algorithm further comprises:
   removing an instance classified as falling if the instance occurs before a specific time in a trajectory containing the instance, wherein the specific time is based on a time of onset of a monotonic decrease of a height of a center of mass of the robot.

3. The method of claim 1, wherein the learned representation comprises a decision list.

4. The method of claim 1, further comprising:
responsive to classifying the current state of the robot as being falling, activating a fall controller of the robot.

5. The method of claim 4, wherein the fall controller of the robot controls the robot to fall in a manner that reduces damage to the robot or an object near the robot.

6. The method of claim 1, wherein one of the plurality of features comprises a height of the center of mass of the robot.

7. The method of claim 1, wherein one of the plurality of features comprises a foot contact mode of the robot.

8. The method of claim 7, wherein the learned representation comprises a plurality of decision lists each associated with a different foot contact mode of the robot.

9. A non-transitory computer-readable storage medium storing executable computer program modules for predicting a fall of a robot having at least two legs, the computer program modules when executed by a processor causing the processor to perform steps including:
generating a learned representation using a supervised learning algorithm, the learned representation taking as inputs a plurality of features of a robot, the learned representation having as an output a classification comprising an indication of a balanced state or a falling state, wherein generating the learned representation using the supervised learning algorithm further comprises steps of:
applying a plurality of simulated force impulses to a simulation of the robot, the force impulses varying in magnitude of force and direction of application;
recording a plurality of trajectories generated from the motions of the robot after application of the plurality of simulated force impulses, each trajectory comprising a plurality of instances, each instance comprising a plurality of features describing the state of the robot at the particular instance;
classifying each instance as a balanced instance or as a falling instance based on whether the trajectory containing the instance ends in a fallen state; and
processing the features and classification of each instance with the supervised learning algorithm to generate the learned representation;
determining a plurality of features of a current state of the robot, the determining based at least in part on a current value of a joint angle or joint velocity of the robot; and
classifying the current state of the robot as being either balanced or falling, the classifying performed by evaluating the learned representation with the plurality of features of the current state of the robot.

10. The non-transitory computer-readable storage medium of claim 9, wherein generating the learned representation using the supervised learning algorithm further comprises:
removing an instance classified as falling if the instance occurs before a specific time in a trajectory containing the instance, wherein the specific time is based on a time of onset of a monotonic decrease of a height of a center of mass of the robot.

11. The non-transitory computer-readable storage medium of claim 9, wherein the learned representation comprises a decision list.

12. The non-transitory computer-readable storage medium of claim 9, wherein the modules are further configured for:
responsive to classifying the current state of the robot as being falling, activating a fall controller of the robot.

13. The non-transitory computer-readable storage medium of claim 12, wherein the fall controller of the robot controls the robot to fall in a manner that reduces damage to the robot or an object near the robot.

14. The non-transitory computer-readable storage medium of claim 9, wherein one of the plurality of features comprises a height of the center of mass of the robot.

15. The non-transitory computer-readable storage medium of claim 9, wherein one of the plurality of features comprises a foot contact mode of the robot.

16. The non-transitory computer-readable storage medium of claim 15, wherein the learned representation comprises a plurality of decision lists each associated with a different foot contact mode of the robot.

* * * * *